UNITED STATES PATENT OFFICE.

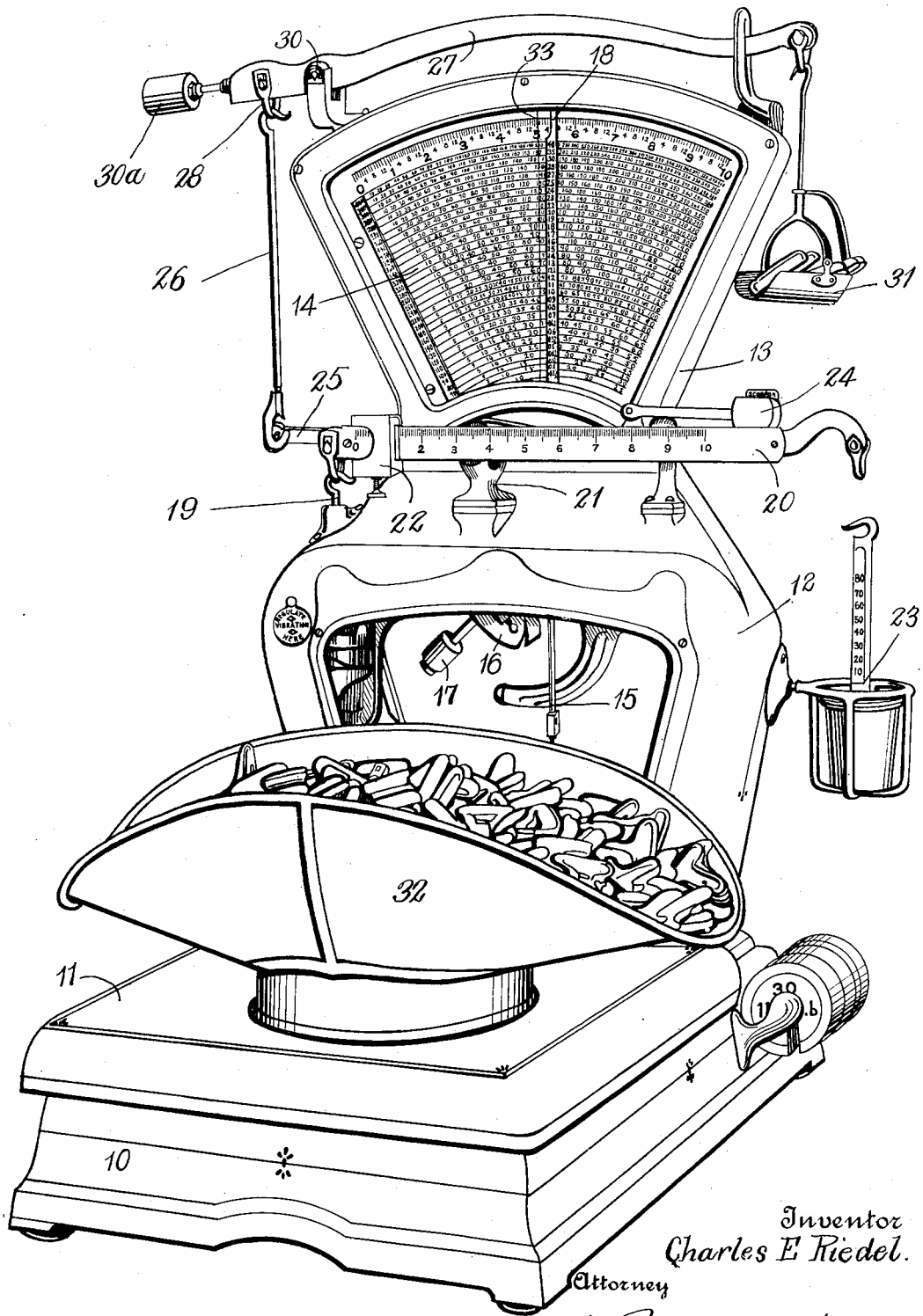

CHARLES EDWARD RIEDEL, OF DETROIT, MICHIGAN, ASSIGNOR TO DETROIT AUTOMATIC SCALE COMPANY, OF DETROIT, MICHIGAN, A CORPORATION OF INDIANA.

COMBINED COMPUTING AND COUNTING SCALE.

1,379,215.           Specification of Letters Patent.     Patented May 24, 1921.

Application filed August 11, 1917. Serial No. 185,667.

*To all whom it may concern:*

Be it known that I, CHARLES E. RIEDEL, a citizen of the United States, residing at Detroit, county of Wayne, and State of Michigan, have invented certain new and useful Improvements in Combined Computing and Counting Scales, of which the following is a full, clear, and exact description.

This invention relates to certain new and useful improvements in scales and more particularly to a scale which is adapted to be used as a plain weighing scale, a computing scale or as a counting scale.

In mercantile establishments, and also particularly in factories where small parts are made, various forms of counting scales have been employed. These counting scales usually comprise a beam scale having in place of the manually shiftable poise an article receptacle into which are placed a certain definite number of articles. The article carrier is usually manually adjusted upon the beam by a suitable mechanism, and when the beam comes to balance the number of articles on the platform is ascertained by a reading of a particular scale on the beam, corresponding to the number of articles in the weight carrier. These scales have usually been used solely for counting purposes, and it is among the objects of the present invention to provide a scale which may be used for counting purposes as well as for ordinary weighing operations. Other objects reside in the provision of a scale which is automatic in character, *i. e.*, ordinarily within a defined range the scale is adapted to automatically counterbalance the load without manual manipulation.

In addition, the scale is adapted to be used as a computing scale for determining prices of articles weighed, parcel post rates, and other computed costs.

Other objects of the invention will be pointed out in more detail in the accompanying specification and more particularly defined in the appended claims.

In the drawings the scale shown is of the type shown and fully described in the patent to Hopkinson and Ozias, No. 867,671, to which reference may be had for a complete description.

The scale comprises a base 10, having a platform 11, a pedestal 12, surmounted by a chart housing 13 which has the usual fan-shaped computing and weight chart 14.

The lever system in the base of the scales connects with a tape 15, which coöperates with the usual segment 16 carrying pendulum 17, and also carrying an indicating hand or indicator 18 of the usual form. A steelyard 19 extends from the base lever system and connects with a main scale lever 20 of the first order fulcrumed upon the pedestal 21. This beam carries the usual sliding poise 22 which may also be used for tare and also for normal weighing operation the beam carries a pendant weight 23 on which the usual weights for increasing the capacity of the scale can be placed. In the drawings this pendant weight is shown detached for reasons which will be hereafter explained. The scale beam also carries the pivoted scoop weight 24, described in my copending application, Serial No. 126,468.

The parts just described constitute a regular weighing and computing scale and may be used for ordinary weighing and price computing operations.

In many places where scales are used it is desirable to provide a mechanism for counting various small articles. To this end I have provided a supplementary mechanism which may be coupled with the scale moved parts to convert the weighing scale into a counting scale. These parts will now be described.

Preferably integral with beam 20 and extending to the left of the point of connection of the steelyard hook 19 is an arm 25 which carries pivots which coöperate with the lower bearings of a supplementary steelyard or link 26. This steelyard has a hook at its upper end which is attached to a supplementary multiplying beam 27 through loop 28. The supplementary beam or counting 27 is a lever of the first order, being pivoted at 30 upon bearings carried by a pedestal upon the top of the chart housing. One end of the beam 27 adjacent steelyard 26 has an adjustable counterbalancing weight 30ª and the other end carries a depending article carrier 31. Suitable guides on the chart housing limit the movement of the supplementary beam on its up and down movement.

When the scale is to be used as a counting scale the parts are coupled as shown in the drawing, the supplementary lever 27 being connected to the main lever system through the parts 28—26. A given number of articles to be counted, say 10, are then placed in the article carrier 31. The scoop weight is swung to "on" position, as shown, and the pendant 23 detached. Articles are then poured into the scoop 32. The indicator hand 18 then swings to the right until eventually the indicating wire 33 will aline with the five pound mark on the chart as shown, when sufficient articles have been placed in the scoop to balance the smaller number of articles in the carrier 31. This shift of the indicator from its normal position at the initial or zero graduation of the weight-indicating chart is due to the fact that the weighing ratio or ratio of leverage between the platform or article-support 11 and the article carrier 31 is different from (in the present instance greater than) the ratio of leverage when only the main beam is used. This greater ratio depends (the length of the lever arm to which the article carrier is attached being assumed) upon the points at which the link 26 is connected to the main beam and supplementary or counting beam. In the scale illustrated the counting ratio is such that when sufficient articles are placed in the scoop to balance the fewer articles in the carrier 31 the indicator will stand at the 5-lb. mark, which is the center graduation of the chart. This indication will therefore apprise the person placing the articles on the scoop that the scale is in balance. Then knowing the fixed multiplication of the lever system, or counting ratio for example 100 to 1, it will be known that there are 10 times 100 or 1,000 articles in the scoop.

The usual price graduations upon the chart are also of value for counting operations, since by experience the operator can determine how many articles under or over a particular number are in the pan. The operator finds by experience that with certain kinds of articles each graduation on a particular scale corresponds to a certain number of articles. Then by noting the position of the indicating wire with reference to the 5-lb position he can readily calculate the number of articles over or under 1,000 which are in the pan.

For regular weighing operations the supplementary lever or beam 27 is detached by disengaging the steelyard 26 from its cooperating pivots on the main beam 20.

The pendant weight 23 is then reattached and the scale may then be used in the usual manner as a weighing or computing scale.

It will be obvious that the construction may be modified in various ways as will occur to those skilled in the art.

What I claim is:

1. In a counting scale, the combination of a support for articles to be weighed, a main beam, means connecting the said support with the main beam, a supplementary beam, a detachable link connecting the supplementary beam to the main beam, and an article carrier on the supplementary beam adapted to receive one or more articles and through said link and main beam and connecting means to counterbalance a larger number of similar articles placed on the said support in a predetermined ratio.

2. In a counting scale, the combination of a support for articles to be weighed, a main beam, means connecting the support with the main beam, a supplementary beam, an article carrier on the supplementary beam, and a detachable link connecting the main beam and the supplementary beam, whereby the two may be used simultaneously for counting or the main beam independently for weighing.

3. In a counting scale, the combination of a support for the articles to be weighed, a main beam, means connecting the support with the main beam with a predetermined ratio of leverage, a pivoted supplementary beam, an article carrier on the supplementary beam, and means connecting the supplementary beam to the main beam at a point on the latter which will give the supplementary beam a fixed and greater ratio of leverage with respect to said support, said connection being adapted to cause the weight of the articles in the article carrier to react through the supplementary beam against the weight of articles carried by the support.

4. In a counting scale, the combination of a support for articles to be weighed, a graduated weight-indicating chart, an indicator traversing said chart, means connecting the said support with the indicator to actuate the latter, a counting beam, an article carrier on the counting beam, and means connecting the counting beam with the said support to give a predetermined ratio of leverage and thereby hold the said indicator at a predetermined intermediate graduation of the weight-indicating chart when the said article support and article carrier are in balance.

5. In a counting scale, the combination of a support for articles to be weighed, a graduated weight indicating chart, an indicator traversing said chart, means connecting the said support with the indicator to actuate the latter, a main beam having tare and capacity poises, means connecting the main beam with the said support, a counting beam, an article carrier on the counting beam, and means connecting the main beam and the counting beam with a ratio of leverage causing the said indicator to stand at an intermediate position on the indicating chart when the said article support and article carrier are both empty.

6. In a counting scale, the combination of a support for articles to be weighed, a graduated weight-indicating chart, an indicator traversing the chart, means connecting the said support with the indicator to actuate the latter and affording a ratio of leverage by which the indicator is caused to stand normally at the initial graduation of the chart, a counting beam, an article carrier thereon, and detachable means for connecting the counting beam with the article support, affording a ratio of leverage by which the said indicator is caused to stand at the center graduation of the chart when the scale is in balance.

7. In a counting scale, the combination of a support for articles to be weighed, a main beam, means connecting the article support with the main beam and affording a predetermined ratio of leverage, a supplementary beam, an article carrier thereon, and releasable means connecting the supplementary beam with the main beam and affording a ratio of leverage between the article support and the article carrier which is different from the first-mentioned ratio.

8. In a counting scale, the combination of a computing scale having a support for the articles to be weighed, a chart provided with a plurality of series of price graduations, an indicator traversing the chart, a counting beam, an article carrier thereon, means connecting the article support with the counting beam, said connection being adapted to cause the weight of articles in the article carrier to react through the counting beam against the weight of articles carried by the support and a variable force-exerting counterbalancing means associated with the indicator and entirely independent of the article carrier and the weighted articles therein, said means exerting a variable counterbalancing force against the articles carried by the support and causing a variable displacement of the indicator over the chart whereby the scale can be used for weighing operations not involving counting and without the placing of weighty articles in the article carrier.

In testimony whereof I affix my signature.

CHARLES EDWARD RIEDEL.